(No Model.) 2 Sheets—Sheet 1.

J. A. HANEY & F. J. O'CONNELL.
ANIMAL TRAP.

No. 465,780. Patented Dec. 22, 1891.

WITNESSES:
W. R. Davis
C. Sedgwick

INVENTORS
J. A. Haney
F. J. O'Connell
BY Munn & Co.
ATTORNEYS (No Model.) 2 Sheets—Sheet 2.
J. A. HANEY & F. J. O'CONNELL.
ANIMAL TRAP.
No. 465,780. Patented Dec. 22, 1891.
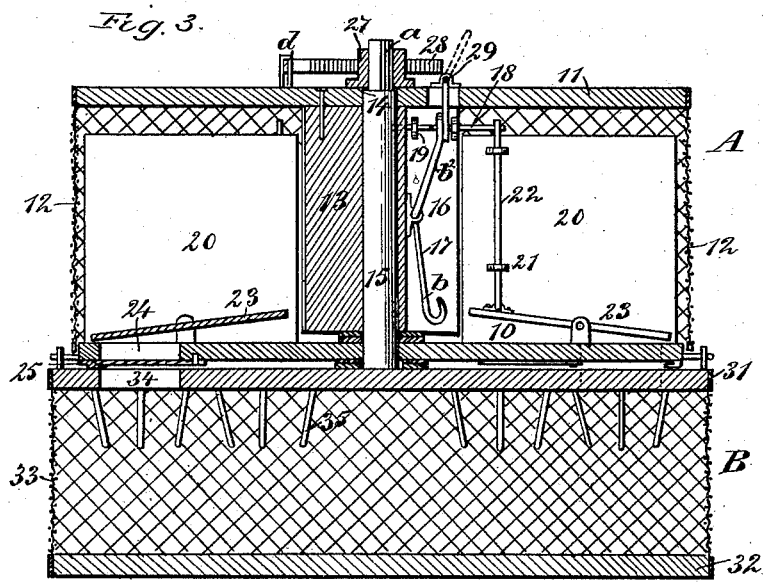
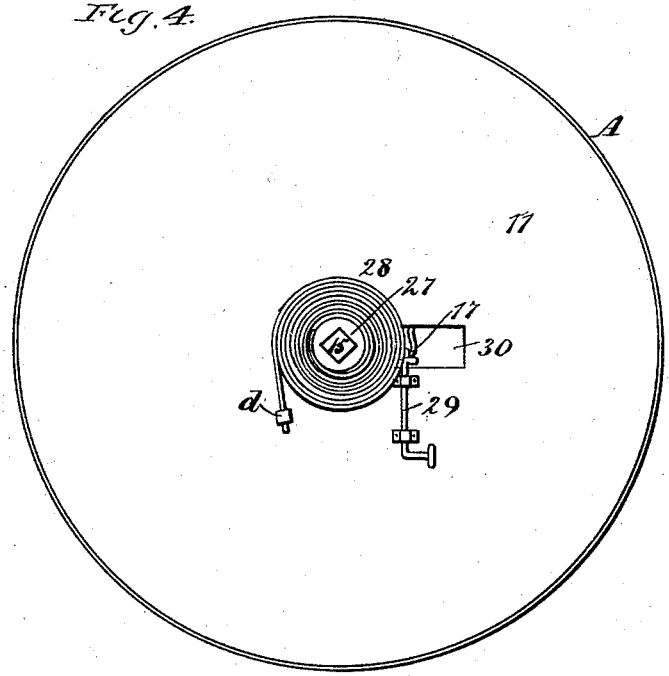
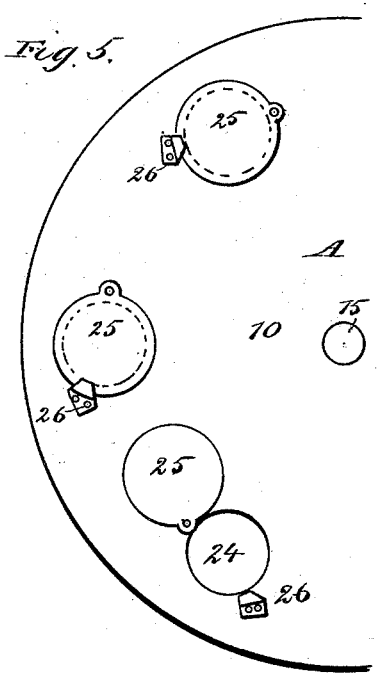
WITNESSES:
W. R. Davis
C. Sedgwick
INVENTORS:
J. A. Haney
F. J. O'Connell
BY Munn & Co.
ATTORNEYS

UNITED STATES PATENT OFFICE.

JUDSON A. HANEY AND FRANK J. O'CONNELL, OF COAL GROVE, OHIO.

ANIMAL-TRAP.

SPECIFICATION forming part of Letters Patent No. 465,780, dated December 22, 1891.

Application filed April 3, 1891. Serial No. 387,512. (No model.)

*To all whom it may concern:*

Be it known that we, JUDSON A. HANEY and FRANK J. O'CONNELL, of Coal Grove, in the county of Lawrence and State of Ohio, have invented a new and useful Improvement in Animal-Traps, of which the following is a full, clear, and exact description.

Our invention relates to an improvement in animal-traps, and has for its object to provide a simple and durable trap so constructed that an animal upon entering the trap immediately becomes a prisoner, and whereby the trap is automatically set for the reception of another visitor.
A further object of the invention is to provide a means whereby the trap proper may be provided with an attached receptacle and a connection between the receptacle and the stalls of the trap, so that the animals imprisoned in the stalls may enter the lower receptacle, and thus provide for the entrance of another animal into the stall vacated.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
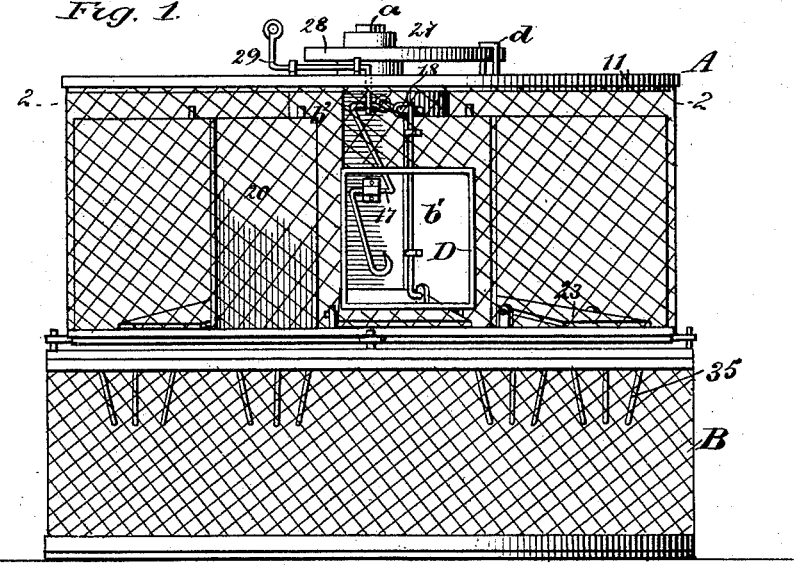
Figure 2:
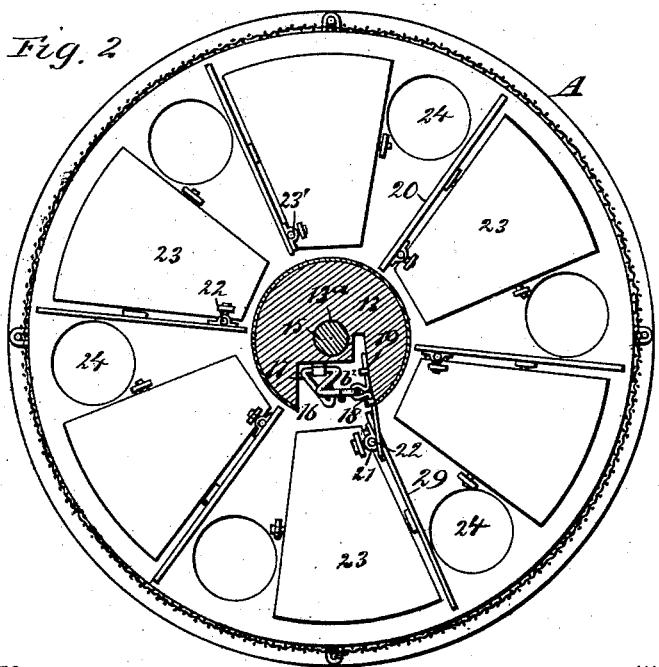

Figure 1 is a side elevation of the trap. Fig. 2 is a horizontal section taken practically on the line 2 2 of Fig. 1. Fig. 3 is a vertical section through the trap. Fig. 4 is a plan view of the trap, and Fig. 5 is a partial bottom plan view of the main or upper section of the trap.

The main or upper section A of the trap consists of a base 10 and a cover 11. The cover 11 is preferably provided with a wire-netting 12, secured to and extending downward from its margin a sufficient distance to partially inclose the base 10. Both the cover and the base are preferably made circular.
The cover-section has secured to its under face at the center a circular block 13, the attachment being made in any suitable or approved manner, and the block is provided with a central vertical aperture $13^a$, while the cover 11 is furnished with an aperture 14, registering with the aperture in the block.

In the base 10 a post 15 is secured, which post is circular throughout the greater portion of its length; but the upper end of the post is made rectangular, as illustrated at $a$. The post is located at the center of the base, and is adapted to pass upward and fit loosely in the vertical aperture of the block 13. The circular portion of the post terminates at the upper edge of the cover-opening 14, and the rectangular portion of the post extends above the cover, as is best shown in Fig. 3. When the cover-section is in position upon the post 15, the lower end of the block 13 is held some distance from the upper face of the base, or the lower end of the block may be provided with a wear-plate to engage with a similar plate attached to the base.

In one side of the block 13 a vertical recess 16 is produced, extending through from top to bottom, and in the recess a bait-hook 17 is centrally pivoted, the said bait-hook preferably consisting of a single piece of wire bent upon itself to form a lower hook-section $b$, adapted to hold the bait, a horizontal section $b'$, whereby the pivotal attachment is made, and an upper hook-section $b^2$, the opposite of the lower hook-section $b$. The upper hook-section $b^2$ is attached to a bolt 18, capable of sliding horizontally in suitable guides 19 upon one side wall of the block-recess 16. When the lower end of the bait-hook is drawn outward, the bolt 18 is carried inward practically within the recess 16. When, however, the lower extremity of the bait-hook is pressed inward, it being held in that position by the bait, the bolt 18 is forced outward some distance beyond the side of the block 13.

The base 10 of the body-section of the trap is divided into a series of stalls by vertical partitions 20, which partitions are secured to the base in any suitable or approved manner, and extend radially from the periphery inward in the direction of the center, terminating a sufficient distance from the center to permit the block 13 to freely revolve upon its post 15. The partitions 20 at their inner ends upon one side are provided with guides 21, and in said guides vertical rods 22 are held to slide. Each rod is attached at its lower end to the inner end of a pivoted table 23, one table being located in each stall.

The tables 23 are pivoted at or near their centers, and when their outer ends rest upon the base their inner ends are at an elevation above the base, as shown in Fig. 3. This is the normal position of the tables, and when the tables are in their normal position the attached rods 22 extend a sufficient distance upward to engage with the bolt 18, when said bolt is thrown outward, which, as heretofore stated, takes place as soon as the bait is placed upon the hook 17. The moment, however, the inner end of a table is depressed the rod 22, connected with that table, is disengaged from the bolt 18; or if an animal upon the table should pull upon the bait attached to the hook 17 the bolt 18 will be disengaged from the rod 22, connected with that especial table.

In each stall near each table an opening 24 is made in the base, extending through from top to bottom, and the openings 24, as shown in Fig. 5, may be closed, whenever desired, by plates 25, pivoted upon the lower face of the base and adapted to cover the openings, said plates closing against suitable keepers 26.

The cover-section 11 is adapted to be turned by a spring, and this is effected, preferably, by fixedly locating a collar 27 upon the upper rectangular portion $a$ of the post 15, and one end of a coiled spring 28 is attached to the collar, the opposite end being secured in any suitable or approved manner to the upper face of the cover, as illustrated at $d$ in Fig. 4. The spring may be wound up to a proper tension by drawing the bolt 18 a sufficient distance within the recess 16 to prevent the outer end of the bolt coming in engagement with the vertical rods 21 as the section is turned, and this is effected by pivoting upon the cover-section a lever 29, preferably consisting of a horizontal body-section and a crank-arm at each end of the body, the crank-arms extending from the body in different directions. One crank-arm constitutes a handle, by means of which the lever is operated. The other crank-arm extends downward through an opening 30 in the cover in front of the upper end of the bait-hook 17. When the handle-crank of the lever is carried downward, the crank at the opposite end is made to so bear against the upper portion of the bait-hook that it is pressed within the recess 16 in the block 13, and consequently the bolt is likewise drawn inward. The cover is then turned upon its axis until the spring has been sufficiently wound or contracted, whereupon the lever 29 is restored to its normal position and the bait-hook at its upper end is carried upward by reason of the weight at its lower end, and the bolt is placed in position to engage with the nearest vertical rod 21, which engagement stops all movement of the cover.

In connection with the section of the trap which we have denominated the "body-section" and just described, a receiving-receptacle B is preferably employed. This receiving-receptacle consists of top and bottom plates 31 and 32, connected by sides 33, made of wire-netting or a like material. The cover of the lower receptacle B is provided with a series of apertures 34, corresponding in number and location to the apertures or openings 24 in the base of the body of the trap, the said openings being adapted to register when the two sections of the trap are used together. The upper section of the trap is bolted firmly to the lower section in any approved manner, and around the openings 34 in the lower or receiving section of the trap conically-arranged pins 35 are located, which readily admit of the animal passing from the upper section into the lower or receiving section, but effectually prevent the return of the animal.

In a side of the cover of the section A an opening D is made, and the lower section may be provided with a door of any approved construction. When the trap is set—that is, when the spring has been wound up, the bait placed upon the bait-hook, and the bolt brought into engagement with the vertical rod 21 of one of the tables—the opening D in the cover will be opposite one of the stalls. When an animal enters that stall through the opening D to reach the bait, the animal must tread upon the inner uplifted end of the table, and as soon as this portion of the table is reached or nearly reached the weight of the animal throws the table downward and the rod 21, attached to the table, is drawn in the same direction and disengaged from the bolt 18. The moment the bolt is released from the rod 21 the spring acts to revolve the cover and it continues to revolve until the bolt engages with the rod 22, connected with the table in the next stall, and the opening D will be opposite this latter stall, while exit from the stall in which the animal is located will be entirely cut off, except through the opening 24 in the stall, leading into the receptacle B below the body of the trap; but if the plate 25 at the bottom of the opening 24 be closed over the opening the exit of the animal is entirely cut off. In the event that anything should prevent the table from acting the animal will imprison itself by setting the cover in motion the moment an attempt is made to draw the bait from the hook. It will be observed that only the cover of the trap moves and that a number of animals may be caught and imprisoned without interfering one with the other, and that the trap may be constructed in an exceedingly simple and economic manner.

Having thus described our invention, we claim as new and desire to secure by Letters Patent—

1. In a trap, the combination, with a fixed base divided into a number of stalls and a spring-actuated cover held to revolve on the base, of a block attached to the under side of the cover and revolving with it, a bait-hook pivoted in a recess of the block, a bolt connected with the bait-hook and operated therefrom, a counterpoise-table pivoted in each stall, and rods connected with the tables and adapted for engagement with the bolts, as and for the purpose specified.

2. In a trap, the combination, with a base provided with an attached post, a series of stalls radially arranged around the post, and counterpoise-tables pivoted in each stall, of a block held to revolve upon the post between the inner ends of the stalls, a cover attached to the block, extending downward around the stalls and provided with an opening, a spring controlling the movement of the cover, a bait-hook pivoted in the block, a sliding bolt connected with the upper end of the bait-hook, and rods pivotally attached to the tables and adapted for engagement at their upper ends with the sliding bolt, as and for the purpose set forth.

3. In a trap, the combination, with a fixed base provided with a central post, a series of stalls radially arranged upon the upper face of the base, the floor of each stall being provided with a gated opening, and a pivoted counterbalance-table located upon the floor of each stall, of a block held to turn upon the post of the base and provided with a recess in one side, a cover attached to the upper end of the block and extending downwardly around the stalls and provided in its side with an opening, a bait-hook pivoted in the recess of the block, a bolt connected with the bait-hook, rods pivotally attached to the tables and adapted for engagement with the bolt, a spring secured to the upper end of the post and having its opposite end attached to the cover, and a lever located upon the cover, one end of which lever constitutes a handle, while the opposite end is adapted for engagement with the bait-hook or bolt, as and for the purpose specified.

4. In a trap, the combination, with an upper section comprising a base having a series of apertures therein and having its upper face divided into stalls, gates adapted to close the base-apertures, counterpoise-tables pivoted in the stalls, a spring-pressed cover held to turn on the base, provided with an opening in its side and a supporting-block extending downward in the space between the inner ends of the stalls, a bait-hook attached to the block, a bolt connected with the bait-hook, and rods pivoted to the tables and adapted for engagement with the bolt, of a lower compartment provided with a series of openings registering with the openings in the base of the upper compartment, the openings in the lower compartment being surrounded by conically-arranged pins, as and for the purpose set forth.

5. In a trap, the combination, with a stationary base divided into a series of stalls, of a spring-controlled cover, a pivoted bait-hook connected with the cover, a trip-bolt connected with the bait-hook, and adjustable stop-rods located in the stalls and adapted for engagement with the bolt, as and for the purpose specified.

6. In a trap, the combination, with a stationary base provided with a series of stalls and counterbalance-tables located in the stalls, of a spring-propelled cover carrying a block, a bait-hook pivoted in the block, a trip-bolt held to slide on the block and connected with the bait-hook, and sliding stop-rods attached to the normally-elevated ends of the tables and adapted for engagement with the trip-bolt, as and for the purpose set forth.

JUDSON A. HANEY.
F. J. O'CONNELL.

Witnesses:
JOHAN C. DE BANQ,
THOMAS CARR.